(12) United States Patent
Yao et al.

(10) Patent No.: US 9,383,504 B2
(45) Date of Patent: Jul. 5, 2016

(54) BACKLIT KEYBOARD AND LIGHT GUIDE MODULE AND MANUFACTURE METHOD THEREOF

(71) Applicants: DARFON ELECTRONICS (SUZHOU) CO., LTD., Suzhou, Jiangsu Province (CN); DARFON ELECTRONICS CORP., Taoyuan (TW)

(72) Inventors: Liang-Yu Yao, Taoyuan (TW); Hsin-Cheng Ho, Taoyuan (TW); Yu-Ching Ting, Taoyuan (TW)

(73) Assignees: DARFON ELECTRONICS (SUZHOU) CO., LTD., New District, Suzhou, Jiangsu Province (CN); DARFON ELECTRONICS CORP., Gueishan, Taoyuan (TW)

( * ) Notice: Subject to any disclaimer, the term of this patent is extended or adjusted under 35 U.S.C. 154(b) by 23 days.

(21) Appl. No.: 14/272,515

(22) Filed: May 8, 2014

(65) Prior Publication Data
US 2014/0334125 A1    Nov. 13, 2014

(30) Foreign Application Priority Data
May 10, 2013    (TW) .............................. 102116717 A

(51) Int. Cl.
*G01D 11/28*    (2006.01)
*F21V 8/00*    (2006.01)
*H01H 13/83*    (2006.01)

(52) U.S. Cl.
CPC ............ *G02B 6/0055* (2013.01); *G02B 6/0021* (2013.01); *G02B 6/0083* (2013.01); *H01H 13/83* (2013.01); *H01H 2219/044* (2013.01); *H01H 2219/062* (2013.01); *Y10T 29/49002* (2015.01); *Y10T 29/49117* (2015.01)

(58) Field of Classification Search
USPC ...................................... 362/23.03
See application file for complete search history.

(56) References Cited

U.S. PATENT DOCUMENTS

| | | | | |
|---|---|---|---|---|
| 2,153,786 A | * | 4/1939 | Alexander | ............ C23C 14/246 118/726 |
| 6,005,289 A | * | 12/1999 | Watanabe | ........... H01L 21/4857 257/700 |
| 2013/0069562 A1 | * | 3/2013 | Bronstein | .............. H01H 13/83 315/312 |

(Continued)

FOREIGN PATENT DOCUMENTS

| CN | 202076170 U | 12/2011 |
|---|---|---|
| CN | 202405152 U | 8/2012 |

(Continued)

*Primary Examiner* — Evan Dzierzynski
*Assistant Examiner* — Matthew Peerce
(74) *Attorney, Agent, or Firm* — Winston Hsu; Scott Margo

(57) ABSTRACT

A backlit keyboard includes a keyboard module having a plurality of key units and a light guide module including a light guide plate, a metal layer, and an insulation layer. The light guide plate has a light-exit surface and a bottom surface. The metal layer has an upper surface and a lower surface, wherein the upper surface is attached to the bottom surface of the light guide plate. When light is incident onto the upper surface of the metal layer, the light will be reflected back into the light guide plate. When electromagnetic wave reaches the lower surface of the metal layer, the metal layer will shield the electromagnetic wave from propagating. The insulation layer substantially covers the lower surface of the metal layer, wherein at least one ground window is formed in the insulation layer to expose the metal layer.

16 Claims, 11 Drawing Sheets

(56) References Cited

U.S. PATENT DOCUMENTS

2013/0088868 A1* 4/2013 Slowinski ............... F21V 7/00 362/247
2013/0148327 A1* 6/2013 Huang ............... G06F 3/0202 362/23.03
2013/0329396 A1* 12/2013 Smith ............... G06F 1/1656 362/23.03
2014/0138233 A1* 5/2014 Chen ............... G02B 6/0055 200/5 R
2014/0293144 A1* 10/2014 Bae ............... G02F 1/13452 349/12

FOREIGN PATENT DOCUMENTS

| | | |
|---|---|---|
| CN | 103018817 A | 4/2013 |
| JP | 200619103 A | 1/2006 |
| TW | M291077 | 5/2006 |
| TW | M408731 U1 | 8/2011 |
| TW | 201209866 A1 | 3/2012 |
| TW | M443884 U1 | 12/2012 |
| TW | 201301324 A1 | 1/2013 |
| TW | 201318017 A1 | 5/2013 |

* cited by examiner

BACKLIT KEYBOARD AND LIGHT GUIDE MODULE AND MANUFACTURE METHOD THEREOF

BACKGROUND OF THE INVENTION

1. Field of the Invention

The invention relates to a light guide module, and more particularly, to a light guide module of a keyboard, manufacturing method thereof, and a backlit keyboard having the light guide module.

2. Description of the Prior Art

Backlight module is essential to a display or a luminous electronic device like a backlit keyboard, and the light guide plate is one of the key components of the backlight module. To allow more light projected from the backlight module, a reflecting layer is a common solution, which is disposed at a side of the light guide plate opposite to the light-exit surface. The light reflected from the light-exit surface may be further reflected by the reflecting layer back into the light guide plate and the light usage can be increased. Generally, metal has higher reflecting rate and is a suitable material for the reflecting layer. However, with the trend of building the electronic devices in a much lighter and thinner way, it is an inevitable problem that the electromagnetic interference (EMI) should be taken into consideration when using metal as the reflecting layer.

Take a backlit keyboard as an example, a backlit keyboard generally has a light guide plate disposed between a keyswitch module and a circuit unit, whereas a metal reflecting layer is disposed between a light guide plate and the circuit unit. However, as the backlit keyboard is in use, the metal reflecting layer not just reflects the light from the light guide plate, the metal reflecting layer further becomes a medium for conveying electromagnetic waves due to the conductivity of the metal layer. Such characteristic produces abnormal reflection of electromagnetic waves and causes instability to the system.

Additionally, since the metal reflecting layer is conductive, short circuit is likely to happen between the reflecting layer and the circuit unit below, which seriously injures the performance of the device. Hence, it is essential to prevent unwanted interference between the metal reflecting layer and the circuit unit, while the electromagnetic interference is expected to be reduced.

SUMMARY OF THE INVENTION

The invention provides a light guide module that uses a metal layer to shield electromagnetic waves and thus prevents bad influence to the system or device caused by propagation of electromagnetic waves. The metal layer also serves to reflect light back to the light guide plate.

A light guide module is provided in the invention that can effectively reduce the electromagnetic interference (EMI) through the formation of ground windows.

In an embodiment, the invention provides a light guide module, which includes a light guide plate, a metal layer, and an insulation layer. The light guide plate includes a light-exit surface and a bottom surface opposite to the light-exit surface. The metal layer includes an upper surface and a lower surface. The upper surface is attached to the bottom surface of the light guide plate. When light is incident onto the upper surface of the metal layer, the light is reflected back into the light guide plate, and when an electromagnetic wave reaches the lower surface of the metal layer, the metal layer shields the electromagnetic wave from propagating. The insulation layer substantially covers the lower surface of the metal layer, wherein at least one ground window is formed in the insulation layer to expose the metal layer.

In an embodiment, the at least one ground window includes a plurality of ground slits and the plurality of ground slits is not connected with one another. The plurality of ground slits includes at least four ground slits parallel with one another with distance ranging from 0.02 mm to 0.8 mm. The length of each of the at least four ground slits ranges from 0.5 mm to 5 mm and the width of each of the at least four ground slits ranges from 0.05 mm to 0.5 mm.

In an embodiment, the light guide module further includes an adhesive layer disposed between the light guide plate and the metal layer so that the metal layer is attached to the light guide plate.

The invention further provides a method of making a light guide module, which brings up the advantages of effective shielding of electromagnetic waves with low cost and compatible with existing manufacturing procedure.

In an embodiment, the invention provides a method of making a light guide module that includes the following steps: providing a light guide plate having a light-exit surface and a bottom surface opposite to the light-exit surface; transferring a reflective structure onto the bottom surface of the light guide plate, the reflective structure comprising an adhesive layer, a metal layer, and an insulation layer, the adhesive layer disposed between the light guide plate and the metal layer so that the metal layer is attached to the light guide plate and the insulation layer substantially covering a surface of the metal layer opposite to the light guide plate; and forming at least a ground window in the insulation layer to expose the metal layer.

In an embodiment, the reflective structure is transferred onto the light guide plate via thermal melting and thermal deposition. The at least one ground window is formed by a cutting tool cutting the insulation layer. The cutting tool is a cutter having a plurality of separate tips, and forming at least a ground window includes applying the cutter having the plurality of separate tips on the insulation layer to form at least a plurality of ground slits and the plurality of ground slits is not connected with one another. In an embodiment, the plurality of ground slits includes at least four ground slits parallel with one another with distance ranging from 0.02 mm to 0.8 mm. The length of each of the at least four ground slits ranges from 0.5 mm to 5 mm and the width of each of the at least four ground slits ranges from 0.05 mm to 0.5 mm.

In an embodiment, the method of making the light guide module further includes step: electrically connecting the metal layer exposed at the at least one ground window to aground level of a circuit unit.

The invention further provides a backlit keyboard electrically connected to a ground level of a system such that the electromagnetic interference can be effectively reduced.

In an embodiment, the backlit keyboard includes a keyswitch module and a light guide module aforesaid. The light guide module is disposed at a side of the keyswitch module. The keyswitch module includes a plurality of keyswitches and each of the keyswitches is capable of separately being pressed and activated selectively.

In an embodiment, the backlit keyboard further includes a circuit unit having a conductive contact electrically connected to the ground level. The conductive contact faces toward the ground window so as to be electrically connected to the metal layer through the ground window.

In an embodiment, the circuit unit may be an electric circuit board, and the conductive contact includes one of a conductive foamed plastic, a conductive tape, and a silver conductive epoxy. In another embodiment, the circuit unit may be a light module including a light source facing toward the light guide plate and outputting the light. The light module keeps the conductive contact facing toward the ground window. In an embodiment, the light guide plate further includes a light channel passing through the insulation layer and the metal layer. The light source faces toward the light channel and the light outputted by the light source enters the light guide plate through the light channel.

In an embodiment, the backlit keyboard further includes a light module and a plurality of light channels passing through the insulation layer and the metal layer. The light module includes a plurality of light sources and a conductive contact. The conductive contact is electrically connected to the ground level, the plurality of light sources faces toward the plurality of light channels, and the conductive contact faces toward the ground window. In an embodiment, the light module is strip-like. The plurality of light sources and the conductive contact align along a straight line substantially parallel with an edge of the light guide plate.

These and other objectives of the present invention will no doubt become obvious to those of ordinary skill in the art after reading the following detailed description of the preferred embodiment that is illustrated in the various figures and drawings.

DETAILED DESCRIPTION

The invention provides a backlit keyboard, a light guide module, and a manufacturing method thereof. The light guide module can be applied on any electronic device in which light is to be guided, while electromagnetic radiation also needs to be shielded. The electronic device may be, but not limited to, a keyboard, a backlight unit, or a display. Specifically, the light guide module according to the embodiments of the invention may increase its light extracting rate by a metal layer reflecting light, which is also capable of shielding electromagnetic waves. Ground windows are also provided to connect the metal layer to a ground level, in such a way that abnormal reflection of the electromagnetic waves to cause stability issue to the system may be prevented.

Figure 1A:
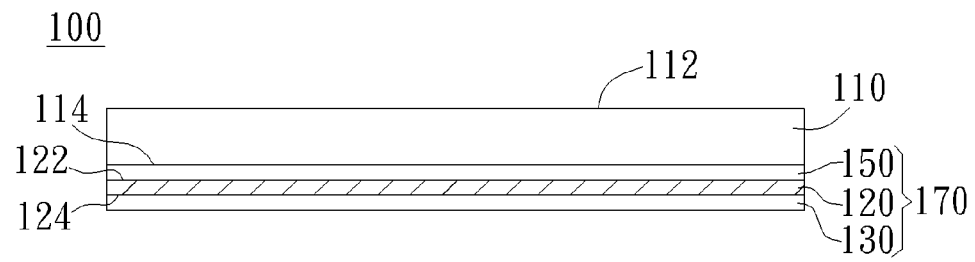
FIG. 1A is an illustration of a light guide module according to an embodiment of the invention.
Figure 1B:
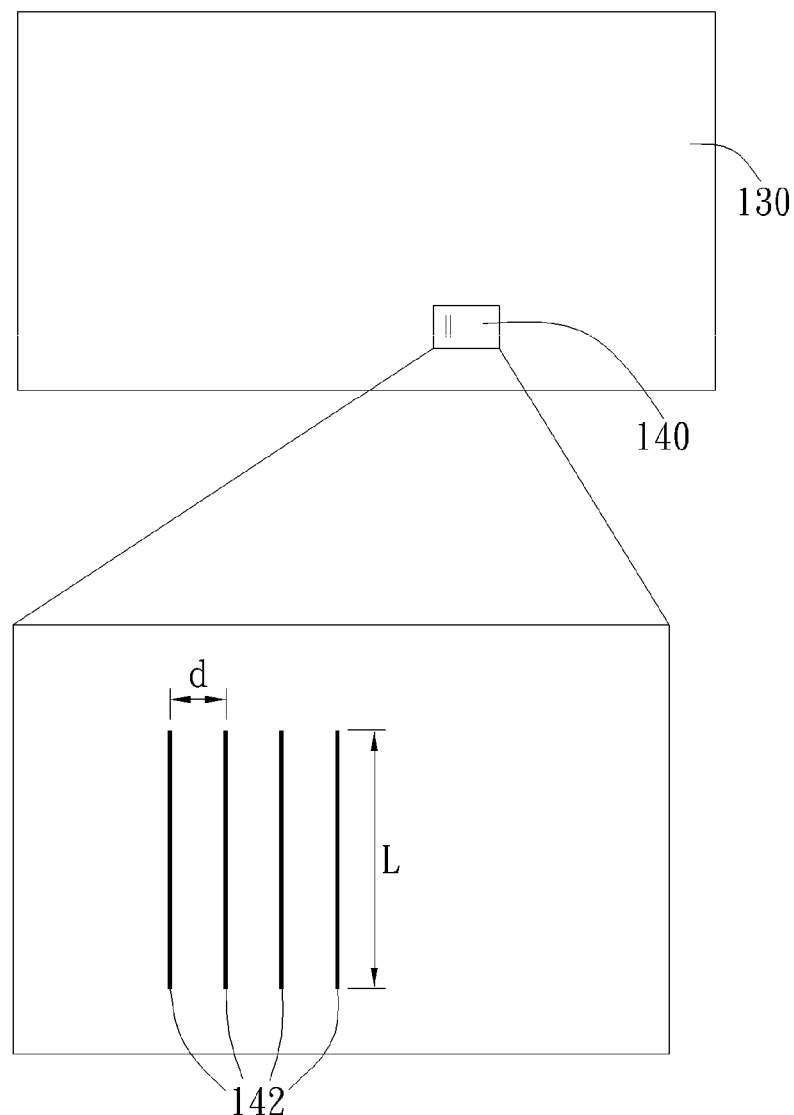
FIG. 1B and FIG. 1C are illustrations of a bottom view and a partial enlarged cross-sectional view of the light guide module respectively according to an embodiment of the invention.
Figure 1C:
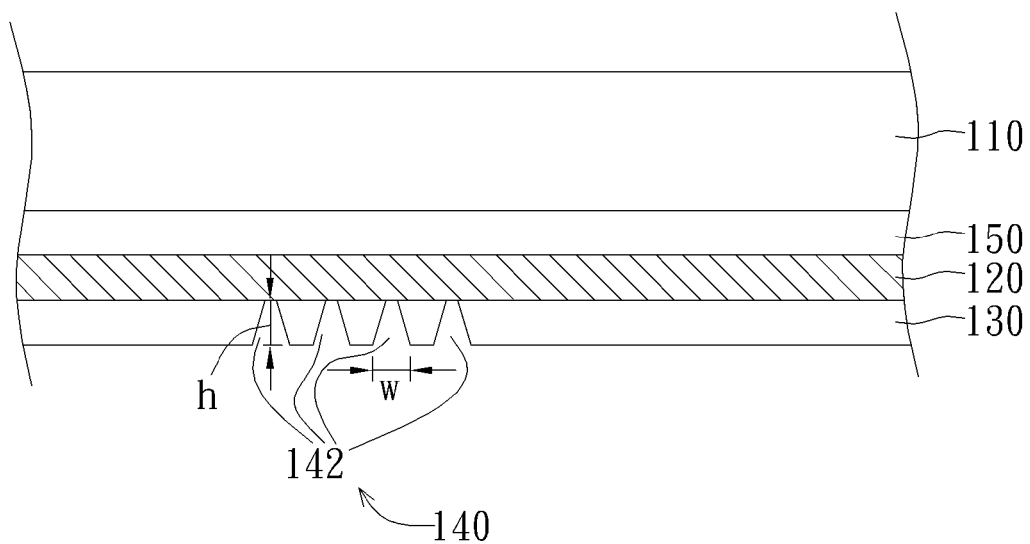

As shown in an embodiment in FIG. 1A to FIG. 1C, a light guide module 100 includes a light guide plate 110, a metal layer 120, and an insulation layer 130. The light guide plate 110 includes a light-exit surface 112 and a bottom surface 114, in which the bottom surface 114 is opposite to the light-exit surface 112. In other words, the light-exit surface 112 and the bottom surface 114 may be an upper surface and a lower surface of the light guide plate 110, respectively. The light guide plate 110 is a medium where the light propagates inside due to the reflection of flat plate surface, and the light exits from the light-exit surface 112 due to certain reflection dots formed on the bottom surface 114; such that the evenness of luminance is substantially improved. In an embodiment, the light guide plate 110 may be formed rectangular and made of any known materials and technology. However, the shape and the material of the light guide plate 110 have no specific restriction in the invention.

The metal layer 120 includes an upper surface 122 and a lower surface 124. The upper surface 122 is attached to the bottom surface 114 of the light guide plate 110. Indifferent embodiments, the metal layer 120 may be attached, either directly or indirectly, to the light guide plate 110 according to the requirement of manufacture and design. When the light travels to reach the upper surface 122 of the metal layer 120, it reflects back into the light guide plate 110, i.e., as part of the light travels within the light guide plate 110 towards the bottom surface 114, the metal layer 120 under the bottom surface 114 functions as a reflective layer to reflect the light back inside the light guide plate 110, thereby increasing the light extracting rate from the light-exit surface 112. Furthermore, when electromagnetic wave reaches the lower surface 124 of the metal layer 120, the metal layer 120 may function as a shielding layer for shielding the electromagnetic wave from propagating or reflecting abnormally, which causes instability to the device. In this embodiment, the metal layer 120 may be made of, but not limited to, metal with high reflective rate such as silver, copper, or aluminum.

The insulation layer 130 substantially convers the lower surface 124 of the metal layer 120 and at least a ground window 140 is formed in the insulation layer 130 to expose the metal layer 120. Please refer to FIG. 1B and FIG. 1C. FIG. 1B is an illustration showing a bottom view of the insulation layer 130 of the light guide module 100 where the ground window 140 of the insulation layer 130 is partially enlarged for illustrative purpose. FIG. 1C is an illustration of a partially enlarged cross-sectional view of the ground window 140. As shown in FIGS. 1A, 1B, and 1C, the insulation layer 120 substantially covers the lower surface 124 of the metal layer 120. The term 'substantially cover' means that except for the formed ground window 140, the insulation layer 130 has complete coverage over the lower surface 124 of the metal layer 120, within the tolerance range of manufacture. In this embodiment, the insulation layer 130 may be regarded as the protection layer of the metal layer 120 as well as the barrier layer isolating the metal layer 120 from other layers or components of the device. As shown in FIG. 1B and FIG. 1C, the ground window 140 includes a plurality of ground slits 142, which are preferably not connected with one another. In this embodiment, for example, the ground window 140 includes at least four ground slits 142 and these ground slits 142 are parallel with one another with distance d ranging from 0.02 mm to 0.8 mm. The length L of each of the ground slits 142 ranges from 0.5 mm to 5 mm, and the width W of each of the ground slits 142 ranges from 0.05 mm to 0.5 mm. Furthermore, the depth h of each of the ground slits 142 is long enough to pass through the depth of the insulation layer 130, which ranges about 0.01 mm to 0.1 mm.

It should be noted that although only one ground windows 140 composed by four ground slits 142 is illustrated in the figure, the number and the position of the ground windows 140, the number of the ground slits 142 each ground window 140 includes, and the size of the ground slits 142 are not limited by the embodiments. In other words, the number and the position of the ground windows 140, the number of the ground slits 142 each ground window 140 includes, and the size of each ground slit 142 can be adjusted according to what the design needs to connect the exposed metal layer 120 to the ground level. For example, in other embodiments, the ground windows 140 can include fewer but larger, wider or longer, ground slits 142 or the ground windows 140 can include more but smaller, narrower or shorter, ground slits 142. Preferably, the ground slits 142 are not larger to the size that the exposed partial metal layer 120 may be shorting or interfering with other layers or other components. The ground slits 142 are also not smaller to the size that may not be able to effectively connect to the ground level of the device. Furthermore, the depth of the ground slits 142 depends on the thickness of the insulation layer 130, i.e., the depth of the ground slits 142 is preferably equal to or slightly larger than the thickness of the insulation layer 130. In other words, if the depth of the ground slits 142 is smaller than the thickness of the insulation layer 130, the metal layer 120 may not be exposed properly; if the depth of the ground slits 142 is larger than the thickness of the insulation layer 130, the metal layer 120 may be overly deepened by the ground slits 142 and be damaged, and even the ability of the metal layer 120 to reflect the light or shield the electromagnetic waves may be compromised.

Additionally, as shown in FIG. 1A, the light guide module 100 further includes an adhesive layer 150 disposed between the light guide plate 110 and the metal layer 120 so that the metal layer 120 can be attached to the light guide plate 110. In one embodiment, the adhesive layer 150, the metal layer 120, and the insulation layer 130 are part of a thermal melting and thermal deposition metal film, i.e., the metal layer 120 along with the insulation layer 130 may be transferred to the bottom surface 114 of the light guide plate 110 using the adhesive layer 150 via thermal melting and thermal deposition and the adhesive layer 150, the metal layer 120, and the insulation layer 130 form a reflective structure 170.

Compared with conventional solutions, the light guide module according to the embodiments of the invention utilizes not only the metal layer to reflect the light back into the light guide plate but the insulation layer to prevent the metal layer from having short circuit or interference with other layers or other components. The insulation layer is further provided to form the ground windows to electrically connect the metal layer to the ground level to shield the electromagnetic waves and reduce the EMI.

Figure 2A:
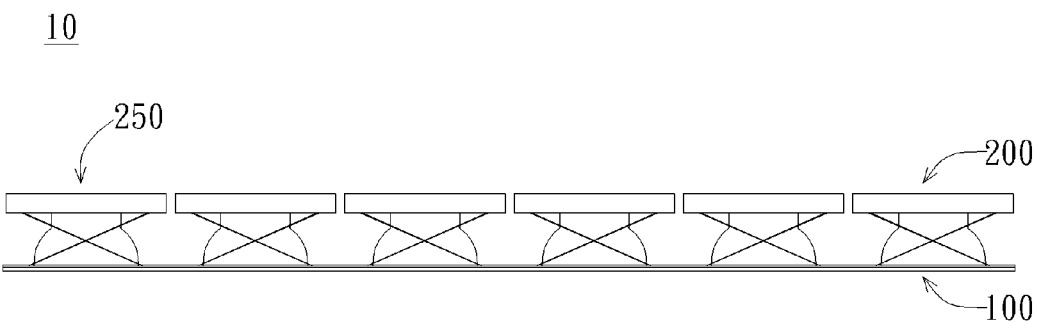
FIG. 2A is an illustration of a backlit keyboard.
Figure 2B:
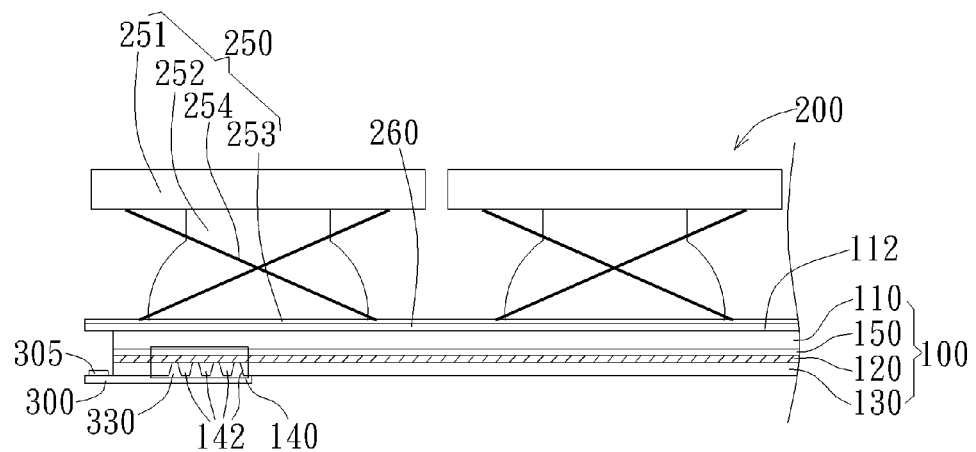
FIG. 2B is an illustration of a partial enlarged view of the backlit keyboard.

The invention also provides a backlit keyboard electrically connected to a ground level. Please refer to FIG. 2A and FIG. 2B. FIG. 2A is an illustration of a backlit keyboard 10 and FIG. 2B is an illustration of a partial enlarged view of the backlit keyboard. In an embodiment as shown in FIG. 2A and FIG. 2B, the backlit keyboard 10 includes aforementioned light guide module 100 and a keyswitch module 200. The keyswitch module 200 includes a plurality of keyswitches 250, each of the keyswitches 250 disposed at a base 260 and capable of separately being pressed and activated selectively. The light guide module 100 is disposed at a side, for example the bottom, of the keyswitch module 200, and the light-exit surface 112 faces toward the keyswitch module 200. The light guide plate 110 can receive light and allow the light to travel within the light guide plate and projects out of the light-exit surface 112 toward the keyswitch module 200. As shown in FIG. 2B, the keyswitch module 200 is disposed at the light-exit surface 112 of the light guide plate 110 and each keyswitch 250 includes a keycap 251, and elastic piece 252, a switch layer 253, and a scissor supporting structure 254. The keycap 251 can have light-transmitting portion (not shown) where the light projected from the light-exist surface 112 of the light guide plate 110 can travel through the light-transmitting portion of the keycap 251 so that the keyboard can be made luminous. The scissor supporting structure 254 connects to the keycap 251 and the base 260 and serves as a lifting structure with vertical displacement to support the keycap 251. The elastic piece 252 provides elastic force that brings the keycap 251 and the scissor supporting structure 254 back to the original position. The switch layer 253 can be controlled to 'activate' the keyswitch 250 when the keycap 251 is pressed. It should be noted that the mechanism of each component (for example, components 251~254) of the keyswitch 250 is known for any person skilled in the art and would be omitted in description for brevity. Furthermore, the implementation of the keyswitch 250 should not be limited to what is described in the embodiments.

Figure 3:
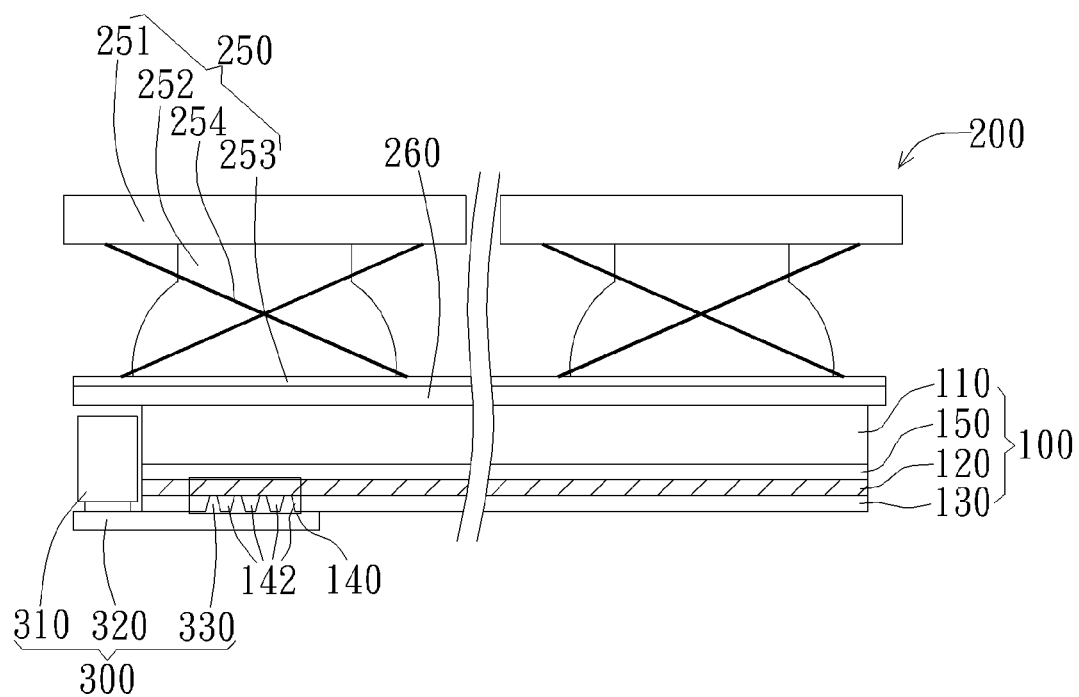
FIG. 3 is an illustration of a backlit keyboard according to another embodiment of the invention.

The backlit keyboard 10 further includes a circuit unit 300, which can be a circuit board as shown in FIG. 2B or a light module as shown in FIG. 3. The circuit unit 300 has a conductive contact 330 electrically connected to the ground level. The conductive contact 330 faces toward the ground window 140 so as to be electrically connected to metal layer 120 through the ground window 140, the ground slit 142 to be particularly. As shown in FIG. 2B, as the circuit unit 300 is a circuit board, the conductive contact 330 may include one of a conductive foamed plastic, a conductive tape, and a silver conductive epoxy. With the conductive foamed plastic, the conductive tape, or the silver conductive epoxy, the exposed partial metal layer 120 due to the ground slit 142 may be electrically connected to the circuit board, and further to the ground level of the keyboard. Furthermore, functional electronic components 305 such as a transistor, a resistance, or an inverter, but not limited to, may also be disposed on the circuit board.

Figure 4A:
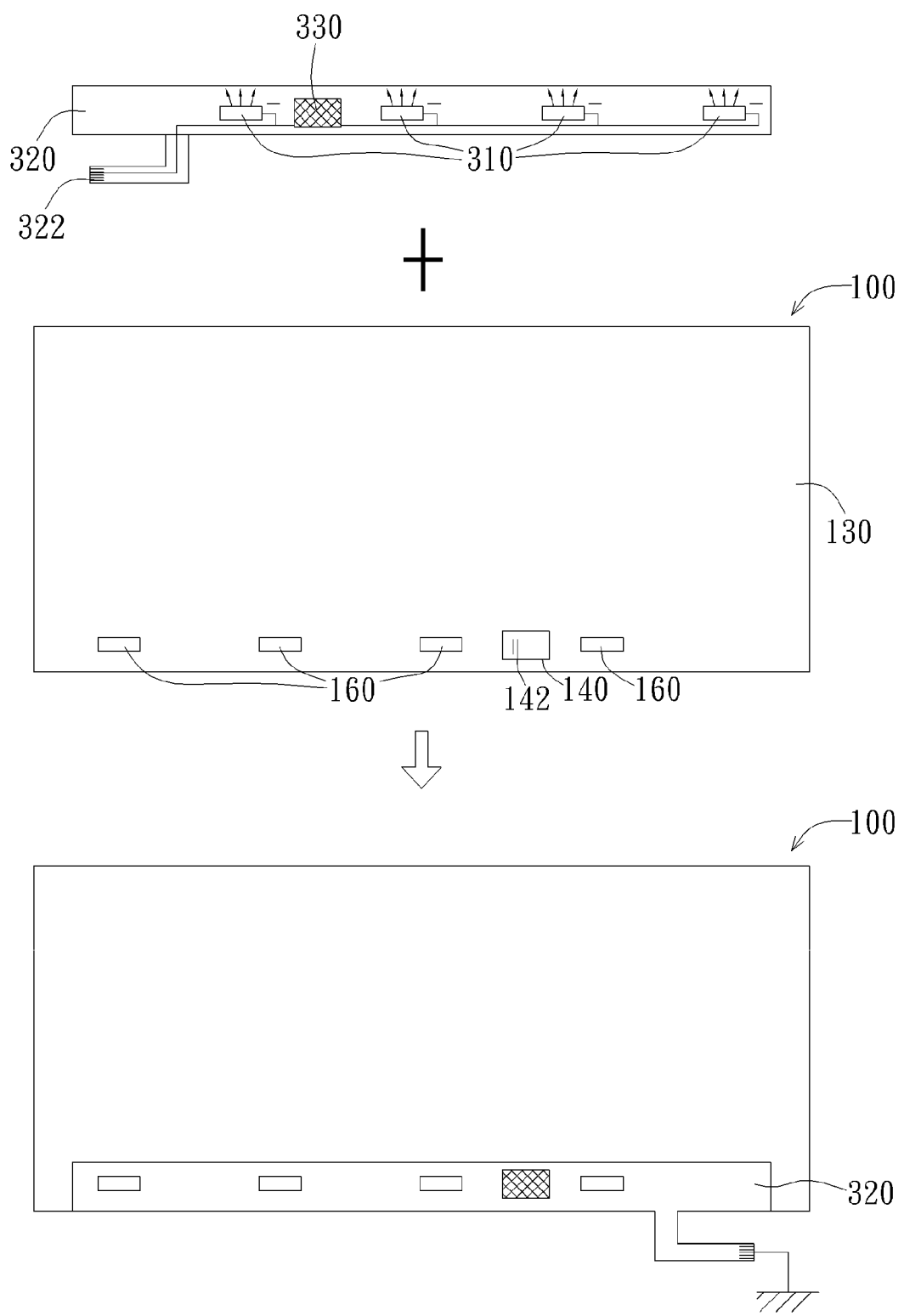
FIG. 4A, FIG. 4B, and FIG. 4C are illustrations of an assembly view and a partially enlarged view of the light guide module and the light module according to an embodiment of the invention.
Figure 4B:
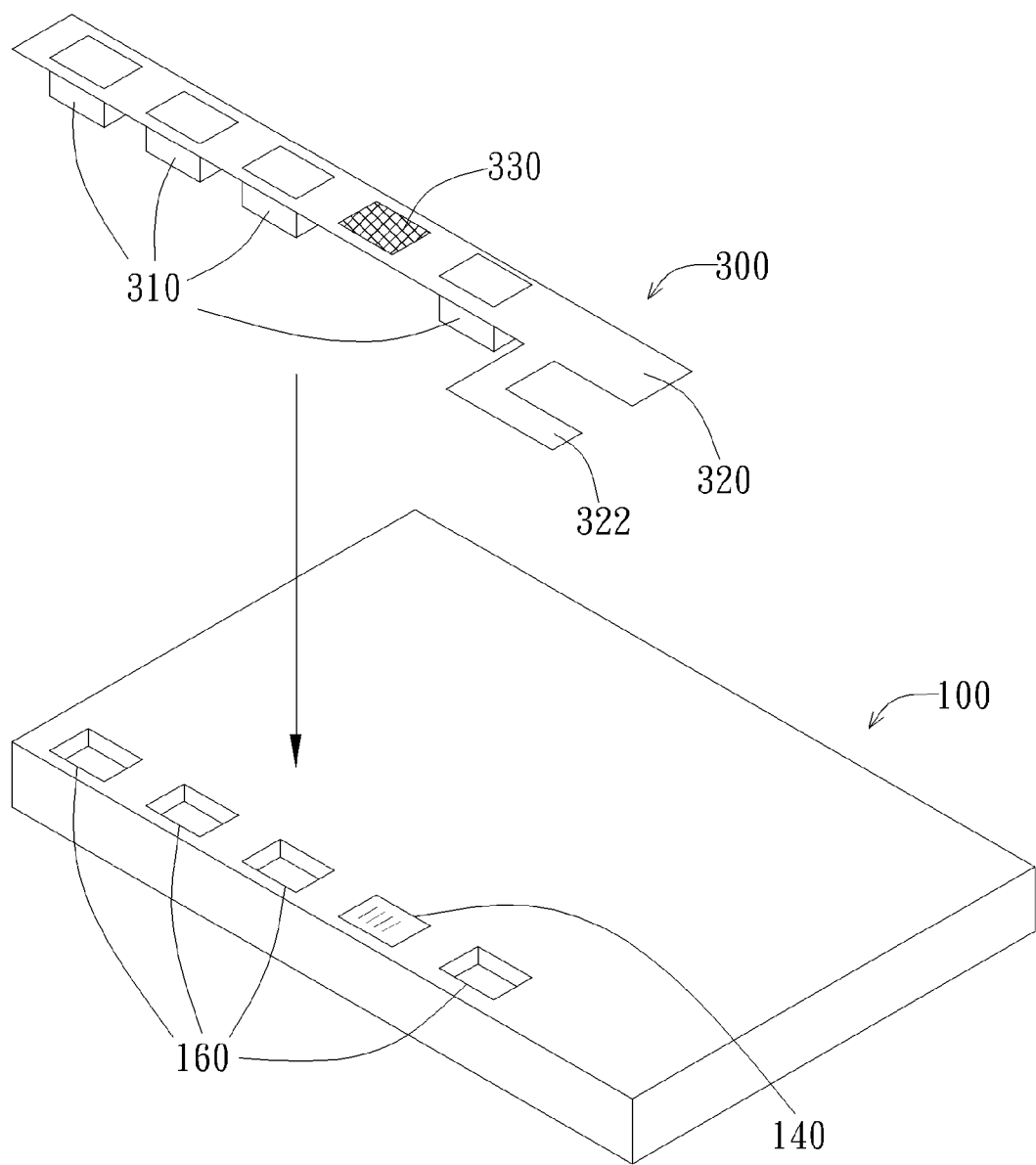
Figure 4C:
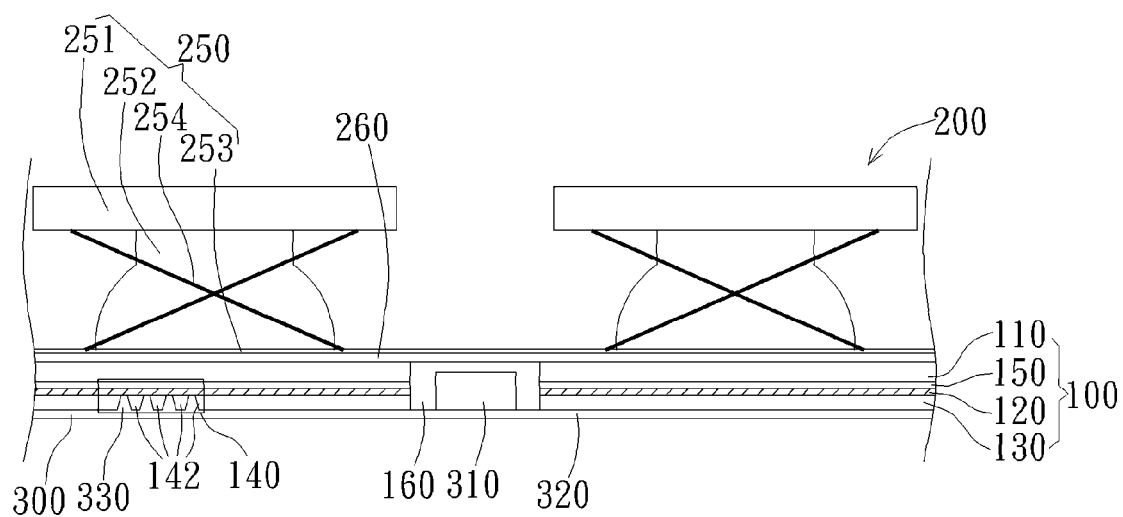

In another embodiment as shown in FIG. 3, the circuit unit 300 is a light module having a plurality of light sources 310 and the light sources 310 face toward the light guide plate 110 and output the light keeping the conductive contact 330 facing toward the ground window 140. Specifically, the light module further includes a flexible printed circuit board 320 and the plurality of light sources 310 is disposed on the flexible printed circuit board 320 and the conductive contact 330 is positioned on the flexible printed circuit board 320 facing toward the ground window 140. In this embodiment, the light sources 310 can be, but not limited to, light emitting diodes and additionally, the light module and the light guide module 100 can be configured to have various embodiments. For example, as shown in FIG. 4A to FIG. 4C, the light guide module 100 further includes a plurality of light channels 160 corresponding to the plurality of light sources 310. The plurality of light channels 160 at least passes through the insulation layer 130 and the metal layer 120, and preferably forms a concaved section (taking up some thickness of the light guide plate 110) on the light guide plate 110, or passing through the light guide plate 110 (taking up all the thickness of the light guide plate 110). The light sources 310 face directly toward the light channels 160 such that the light outputted by the light sources 310 can be directed to enter the light guide plate 110 through the light channels 160. In other words, the plurality of light sources 310 reaches into the corresponding light channels 160 of the light guide module 100 to guide the light outputted by the light sources 310 into the light guide plate 110. Specifically, in this embodiment, the flexible printed circuit board 320 may be strip-like where the plurality of light sources 310 and the conductive contact 330 are aligned along a straight light substantially parallel with an edge of the light guide plate 110. In this embodiment, the conductive contact 330 can be a copper exposure pad on the flexible printed circuit board 320 that can be electrically connected to part of the metal layer 120 exposed on the ground window 140 through a conductive gel. Furthermore, a connecting part 322 extends from the flexible printed circuit board 320 as a connecting component with follow-up system or device so as to integrate the backlit keyboard 10 with other electronic products as will be described in the following paragraphs.

Figure 5A:
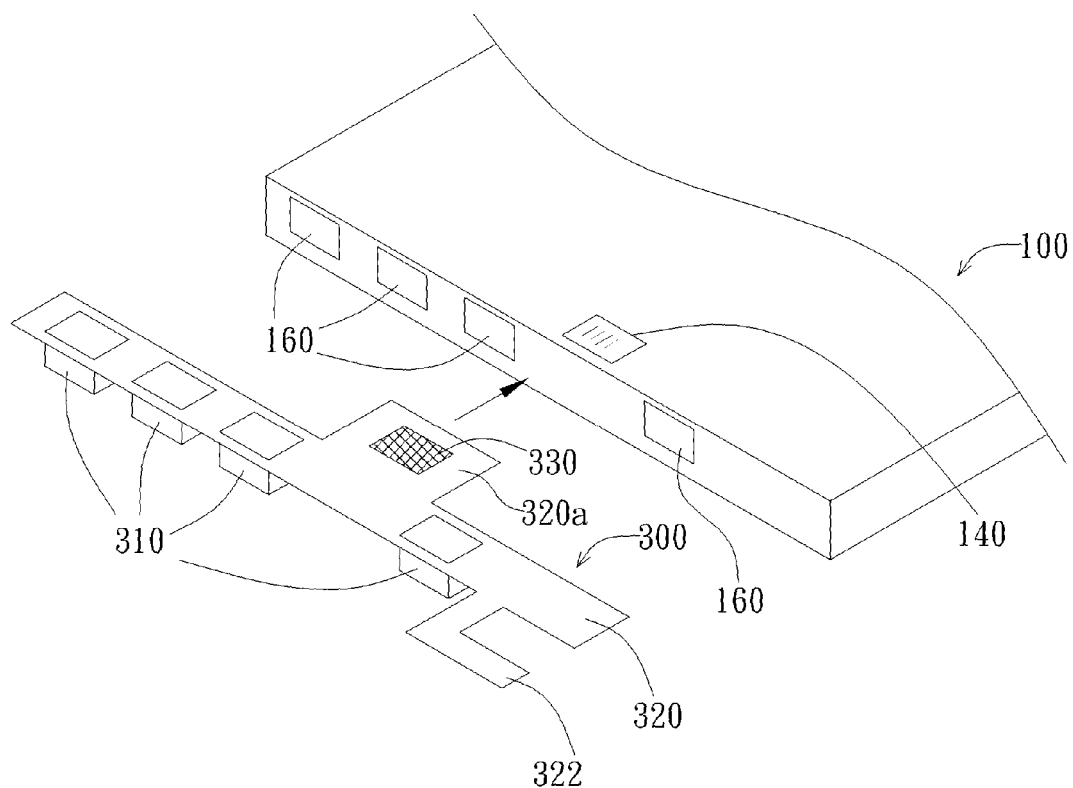
FIG. 5A and FIG. 5B are illustrations of an assembly view and a partially enlarged view of the light guide module and the light module according to another embodiment of the invention.
Figure 5B:
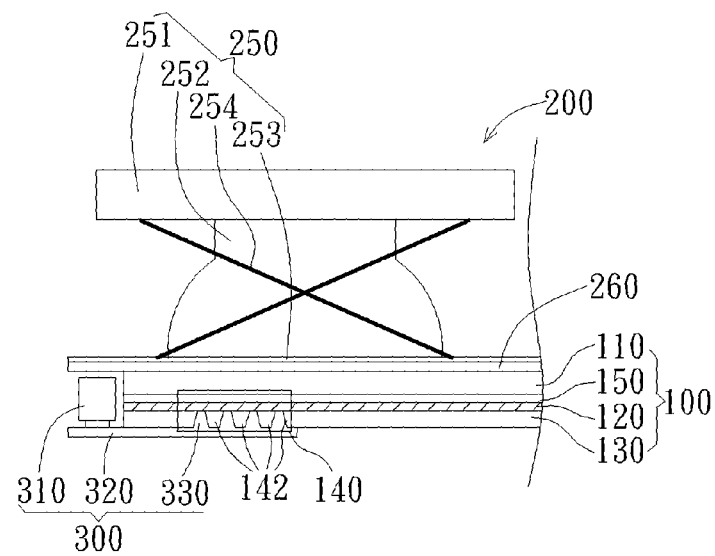

Furthermore, in another embodiment as shown in FIG. 5b, the metal layer 120 and the insulation layer 130 cover only the bottom surface 114 of the light guide plate 110 without extending to the sides of the light guide plate 110, while the light module is deployed at the side of the light guide module 100. Hence, the light module provides light and the light enters the light guide plate 110 from the side and there is no light channel at the bottom of the light guide module 100. In this embodiment, the plurality of light sources 310 and the conductive contacts 330 are not aligned along a straight line, i.e., the flexible printed circuit board 320 has protruded to form an extension part 320a at the position corresponding to the ground window 140, whereas the conductive contact 330 is positioned at the extension part 320a to form electrical connection with the ground window. In this embodiment, the conductive contact 330 can be a copper exposure pad at the extension part 320a of the flexible printed circuit 320 and can be electrically connected to part of the metal layer 120 exposed on the ground window 140 through a conductive gel.

Furthermore, in another embodiment as shown in FIG. 5A, the metal layer 120 and the insulation layer 130 can extend to cover the sides of the light guide plate 110 from the bottom surface 114 of the light guide plate 110 and configured to reflect the light leaked from the sides of the light guide plate 100 back into the light guide plate 110, which will increase the light provided from the light-exit surface 112. In this embodiment, the metal layer 120 and the insulation layer 130 cover all sides, i.e., the four sides, of the light guide plate 110, and accordingly the light channels 160 are formed at the sides (the light injection surface) of the light guide plate 110 facing the light sources 310. The light channels 160 pass through the insulation layer 130 and the metal layer 120 to expose part of the light guide plate 110. As in the assembly stage of the backlit keyboard 10, the light module is guided toward the light guide module 100 so as to align the plurality of light sources 310 with the light channels 160. This ensures the light outputted by the light sources 310 goes directly into the light guide plate 110 through the light channels 160. It should be noted that although a plurality of light channels 160 are illustrated in this embodiment, it can also be a single channel with size capable of accepting a plurality of light sources 310 based on different design need. As for the embodiment with a plurality of light channels 160 each corresponding to the light source 310 as shown in FIG. 5a, the size of each light channel 160 is preferably equal to or slightly larger than the size of each single light source 310. Furthermore, the light sources 310 is preferably a side-type light emitting diodes in the aforementioned embodiments, but should not be regarded as a limitation.

The backlit keyboard according to the invention effectively reduces the electromagnetic interference and increases the stability of the device by electrically connecting the ground window 140 (also the ground slits 142) of the light guide module 100 to the conductive contacts 330 of the circuit unit 300 of the backlit keyboard 10.

Figure 6A:
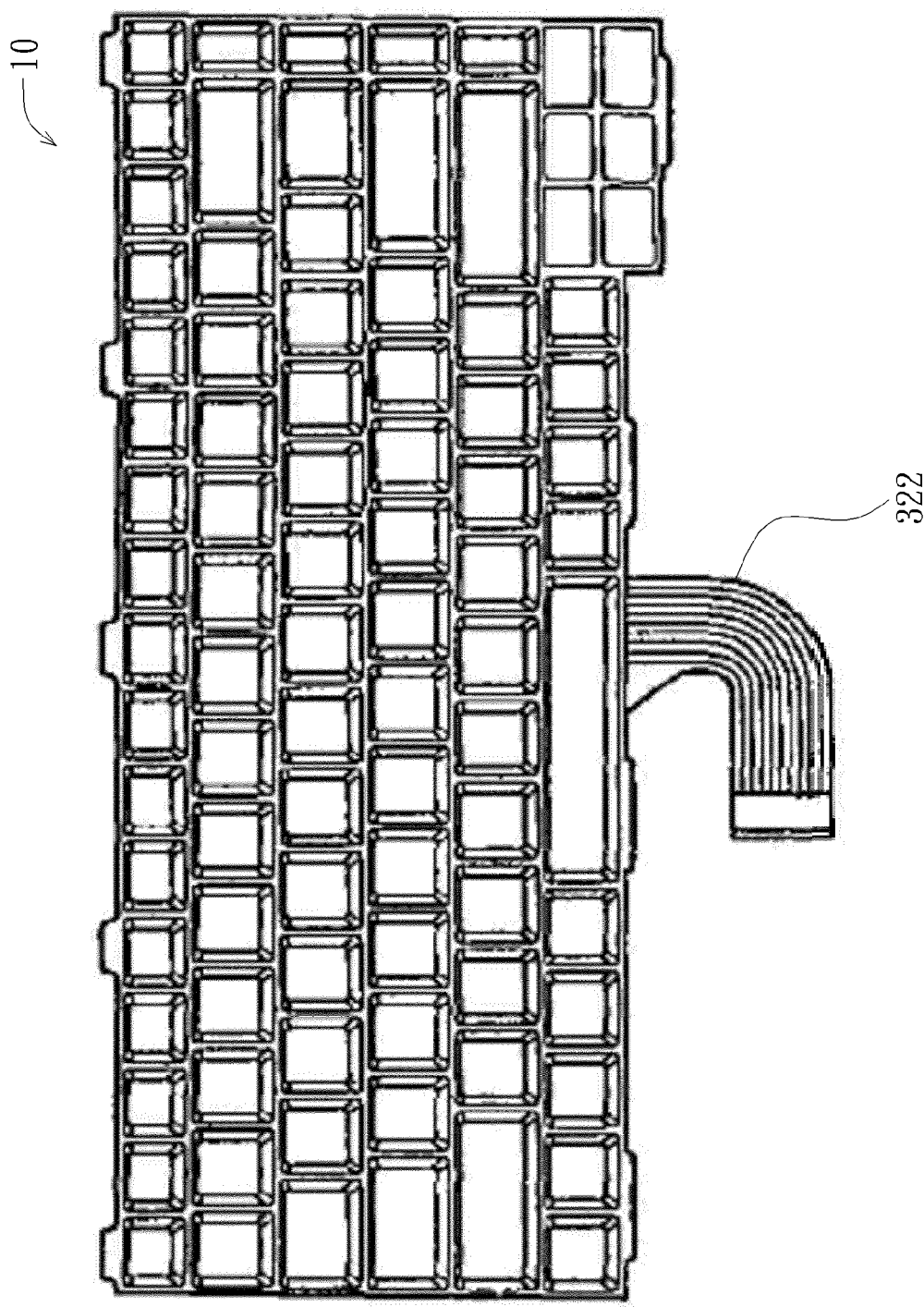
FIG. 6A and FIG. 6B are illustrations showing a modulized backlit keyboard applied to a laptop computer according to an embodiment of the invention.

Furthermore, the backlit keyboard 10 including the light module, the light guide module, and the keyswitch module can be seen as a module like the modulized backlit keyboard as shown in FIG. 6A, and further incorporated into other electronic device as an input device of the electronic device. For example, the backlit keyboard 10 can be applied to a laptop computer. When applied to an electronic device, the backlit keyboard 10 is capable of shielding the electromagnetic interference by means of electrical connection between the backlit keyboard 10 to the ground level of the system through the ground window 140 and the flexible circuit board of the backlight module. In other words, as a modulized application, an embodiment shows a direct electrical connection, through the ground windows 140, between the partially exposed metal layer 120 and the ground contact such as the conductive contact 330 of the circuit board 300. In another embodiment, the electrical connection for the purpose of shielding the electromagnetic interference is shown between a connecting part 322 of the flexible printed circuit board 320 of the light module and the ground contact of the laptop computer.

Figure 6B:
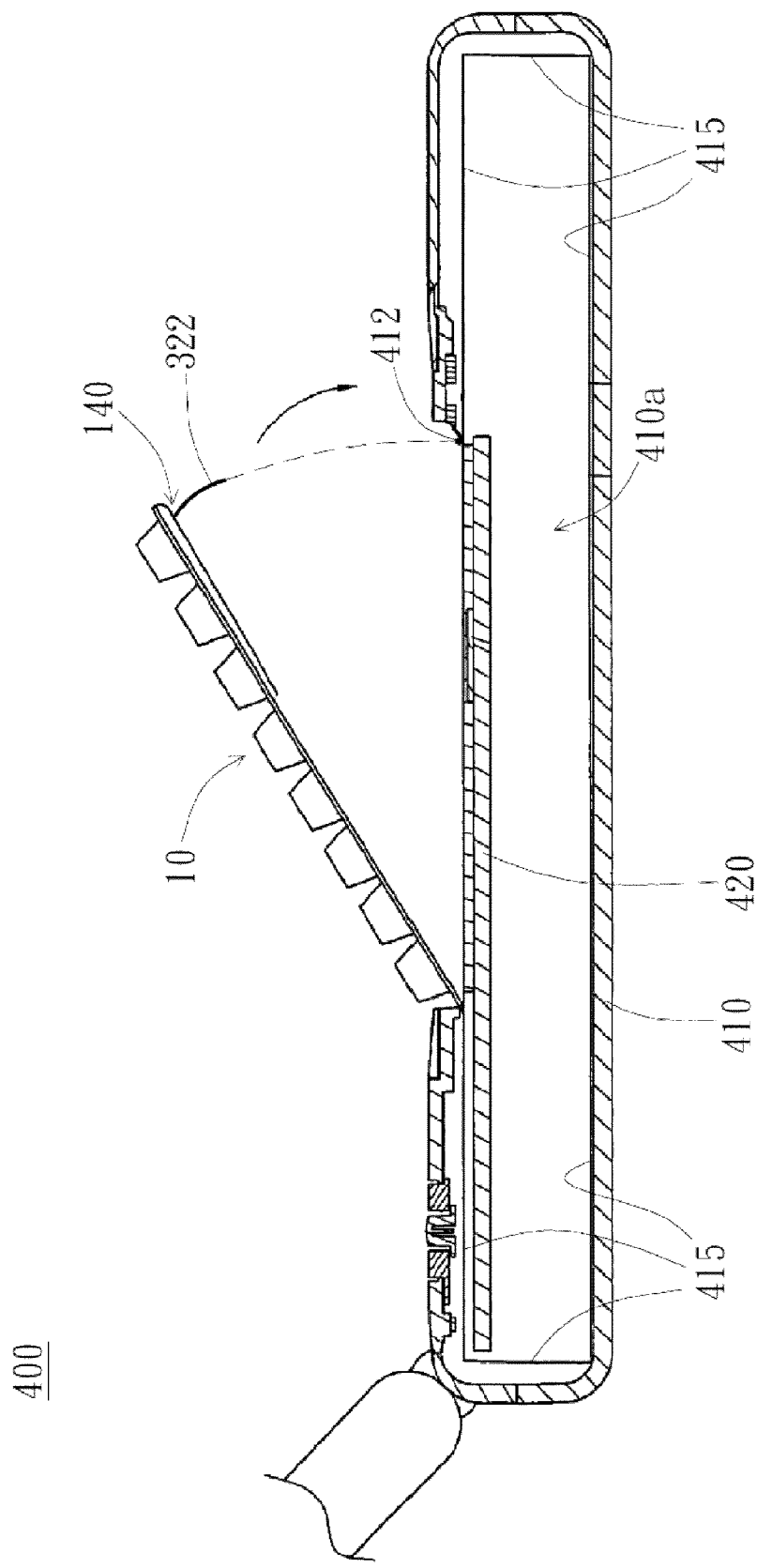
Figure 7:
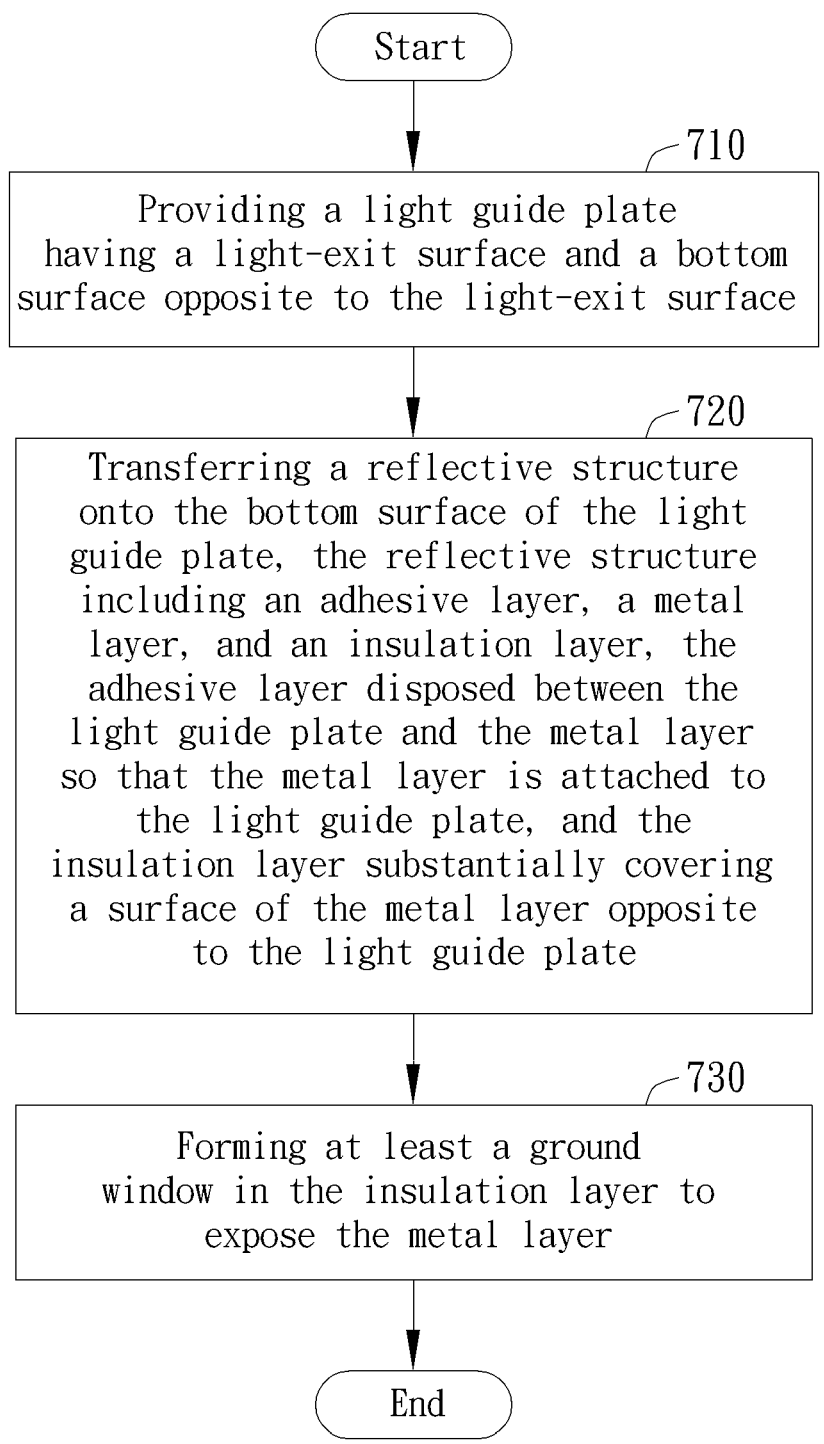
FIG. 7 is an illustration of a method of making a light guide module according to an embodiment of the invention.

As shown in FIG. 6A and FIG. 6B, which is an embodiment of the backlit keyboard 10 applied on a laptop computer 400, the laptop computer 400 has a metal shielding layer 415 inside a housing 410. The metal shielding layer 415 is disposed along the containing space 410a, where high frequency components such as the CPU, the south/north chips, the wireless network chip, and the display card, etc. are disposed therein. The backlit keyboard 100 is disposed at a top opening of the containing space 410a and the containing space 410a has a socket 412 of the ground level or metal shield layer of the laptop computer 400 corresponding to the position of connecting part 322 of the flexible printed circuit board 320.

As the backlit keyboard 10 is placed to have full coverage of the top opening of the containing space 410a, the connecting part 322 of the flexible printed circuit board 320 will be inserted into the socket 412 and thus one end of the ground of the flexible printed circuit board 320 will be electrically connected to the metal layer 120 through the conductive contact 330 and the ground window 140. The other end of the ground of the flexible printed circuit board 320 is electrically connected to the ground level or the metal shielding layer of the laptop computer 400 through the connecting part 322.

With the design of the ground windows 140 in the light guide module 100, the metal layer 120, as a reflective film, of the backlit keyboard 10 can be electrically connected to the metal shielding layer or the ground level of the laptop computer 400, such that the backlit keyboard 10 and the housing 410 of the laptop computer 400, capable of trapping the electromagnetic waves generated by the components on the mainboard inside the containing space 410a to effectively reduce electromagnetic interference and increase the stability of the device.

In another embodiment, a method of making alight guide module is provided. Please refer to FIG. 4 for a flow chart and also refer to FIG. 1A to FIG. 1C. The method according to the invention includes steps:

Step 710: providing a light guide plate 100 having a light-exit surface 112 and a bottom surface 114 opposite to the light-exit surface 112;

Step 720: transferring a reflective structure 170 onto the bottom surface 114 of the light guide plate 110, the reflective structure 170 including an adhesive layer 150, a metal layer 120, and an insulation layer 130, the adhesive layer 150 disposed between the light guide plate 110 and the metal layer 120 so that the metal layer 120 is attached to the light guide plate 110 and the insulation layer 130 substantially covering a surface (such as the lower surface 124 aforementioned) of the metal layer 120 opposite to the light guide plate 110;

Step 730: forming at least a ground window 140 in the insulation layer 130 to expose the metal layer 120.

Details about the light guide plate 110, the reflective structure 170 (including the adhesive layer 150, the metal layer 120, and the insulation layer 130), and the ground window 140 can be referred FIG. 1A to FIG. 1C and related description and will be omitted here for brevity purpose.

In an embodiment, the reflective structure 170 is transferred onto the light guide plate 110 via thermal melting and thermal deposition, i.e., the reflective structure 170 can be a metal film detached from the carrier after the transfer via thermal melting and thermal deposition. The reflective structure 170 uses the adhesive layer 150 to transfer the metal layer 120 along with the insulation layer 130 onto the bottom surface 114 of the light guide plate 110 via thermal melting and thermal deposition.

At least a ground window 140 is formed from cutting the insulation layer 130 by a cutting tool (not shown). The cutting tool can be a cutter having a plurality of separate tips. The step of forming at least a ground window 140 includes applying the cutter having a plurality of separate tips on the insulation layer 130 to form at least a plurality of ground slits 142 and the plurality of ground slits 142 is preferably not connected with one another. It should be noted that the ground slits 142 can be formed in straight line, zig-zag, or other proper shape, and the shape and the size of the ground slits 142 depend on the shape of the tips of the cutting tool, the force exerted on the insulation layer 130, and the direction the cutting tool is applied on the insulation layer 130. Preferably the size of the ground slits 142 should be controlled so that the metal layer 120 is properly exposed without damaging the metal layer 120 or causing short circuit between the metal layer 120 and other layers or components. For example, the plurality of ground slits 142 includes at least four ground slits 142 parallel with one another with distance d ranging from 0.02 mm to 0.8 mm. The length L of each of the at least four ground slits 142 ranges from 0.5 mm to 5 mm, and the width W of each of the at least four ground slits 142 ranges from 0.05 mm to 0.5 mm.

In one embodiment, the manufacturing method according to the invention further includes exposing the metal layer 120 of the at least one ground window 142 to the ground of the circuit unit 300. As shown in FIG. 2B and FIG. 3, the exposed metal layer 120 of the at least one ground window 142 is electrically connected to the ground of the circuit board via the conductive foamed plastic, the conductive tape, or the silver conductive epoxy, or electrically connected to the conductive contacts 330 of the flexible printed circuit board 320 of the light module.

The method of making the light guide module is compatible with existing manufacturing procedures, which uses the cutting tool to achieve effective shielding of electromagnetic waves in a simple, low-cost way.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light guide module, comprising:
    a light guide plate, comprising a light-exit surface and a bottom surface opposite to the light-exit surface;
    a metal layer, comprising an upper surface and a lower surface, the upper surface attached to the bottom surface of the light guide plate, wherein when light is incident onto the upper surface of the metal layer, the light is reflected back into the light guide plate, and when an electromagnetic wave reaches the lower surface of the metal layer, the metal layer shields the electromagnetic wave from propagating;
    an insulation layer, substantially covering the lower surface of the metal layer, wherein at least one ground window is formed in the insulation layer to expose the metal layer; and
    a light module having a conductive contact and a light source, the conductive contact electrically connected to the ground level and facing toward the ground window so as to be electrically connected to the metal layer through the ground window, the light source facing toward the light guide plate and outputting the light
    wherein the light module is utilized for keeping the conductive contact facing toward the ground window.

2. The light guide module of claim 1, wherein the at least one ground window comprises a plurality of ground slits and the plurality of ground slits is not connected with one another.

3. The light guide module of claim 2, wherein the plurality of ground slits comprises at least four ground slits parallel with one another with distance ranging from 0.02 mm to 0.8 mm, the length of each of the at least four ground slits ranges from 0.5 mm to 5 mm, and the width of each of the at least four ground slits ranges from 0.05 mm to 0.5 mm.

4. The light guide module of claim 1, further comprising an adhesive layer disposed between the light guide plate and the metal layer so that the metal layer is attached to the light guide plate.

5. A backlit keyboard, electrically connected to a ground level, the backlit keyboard comprising:
    a keyswitch module, comprising a plurality of keyswitches, each of the keyswitches capable of separately being pressed and activated selectively;
    a light guide module, disposed at a side of the keyswitch module, the light guide module comprising:
        a light guide plate, comprising a light-exit surface and a bottom surface opposite to the light-exit surface, the light-exit surface facing the keyswitch module, the light guide plate receiving a light and allowing the light to travel in the light guide plate;
        a metal layer, comprising an upper surface and a lower surface, the upper surface attached to the bottom surface of the light guide plate, wherein when the light is incident onto the upper surface of the metal layer, the light is reflected back into the light guide plate, and when an electromagnetic wave reaches the lower surface of the metal layer, the metal layer shields the electromagnetic wave from propagating; and
        an insulation layer, substantially covering the lower surface of the metal layer, wherein a ground window is formed in the insulation layer to expose part of the lower surface of the metal layer, the ground level electrically connected to the metal layer via the ground window; and
    a light module having a conductive contact and a light source, the conductive contact electrically connected to the ground level and facing toward the ground window so as to be electrically connected to the metal layer through the ground window, the light source facing toward the light guide plate and outputting the light
    wherein the light module is utilized for keeping the conductive contact facing toward the ground window.

6. The backlit keyboard of claim 5, wherein the ground window comprises a plurality of ground slits and the plurality of ground slits is not connected with one another.

7. The backlit keyboard of claim 6, wherein the plurality of ground slits comprises at least four ground slits parallel with one another with distance ranging from 0.02 mm to 0.8 mm, the length of each of the at least four ground slits ranges from 0.5 mm to 5 mm, and the width of each of the at least four ground slits ranges from 0.05 mm to 0.5 mm.

8. The backlit keyboard of claim 5, further comprising an adhesive layer disposed between the light guide plate and the metal layer so that the metal layer is attached to the light guide plate.

9. The backlit keyboard of claim 5, wherein the circuit unit is an electric circuit board, and the conductive contact comprises one of a conductive foamed plastic, a conductive tape, and a silver conductive epoxy.

10. The backlit keyboard of claim 5, wherein the light guide plate further comprises a light channel passing through the insulation layer and the metal layer, the light source facing toward the light channel and the light outputted by the light source entering the light guide plate through the light channel.

11. The backlit keyboard of claim 5, further comprising a plurality of light channels passing through the insulation layer and the metal layer, the light module comprising a plurality of light sources facing toward the plurality of light channels.

12. The backlit keyboard of claim 5, wherein the light module is strip-like and comprises a plurality of light sources, wherein the plurality of light sources and the conductive contact align along a straight line substantially parallel with an edge of the light guide plate.

13. A method of making a light guide module, comprising steps:

providing a light guide plate having a light-exit surface and a bottom surface opposite to the light-exit surface;

transferring a reflective structure onto the bottom surface of the light guide plate, the reflective structure comprising an adhesive layer, a metal layer, and an insulation layer, the adhesive layer disposed between the light guide plate and the metal layer so that the metal layer is attached to the light guide plate and the insulation layer substantially covering a surface of the metal layer opposite to the light guide plate; and forming at least a ground window in the insulation layer by a cutting tool cutting the insulation layer to expose the metal layer, wherein the ground window has a plurality of ground slits and the plurality of ground slits is not connected with one another;

wherein the cutting tool is a cutter having a plurality of separate tips and forming the plurality of ground slits is applying the cutter having the plurality of separate tips on the insulation layer.

14. The method of claim 13, wherein the reflective structure is transferred onto the light guide plate via thermal melting and thermal deposition.

15. The method of claim 13, wherein the plurality of ground slits comprises at least four ground slits parallel with one another with distance ranging from 0.02 mm to 0.8 mm, the length of each of the at least four ground slits ranges from 0.5 mm to 5 mm, and the width of each of the at least four ground slits ranges from 0.05 mm to 0.5 mm.

16. The method of claim 13, further comprising electrically connecting the metal layer at the at least one ground window to a ground level of a circuit unit.

\* \* \* \* \*